United States Patent Office 3,682,838
Patented Aug. 8, 1972

3,682,838
MULTICOMPONENT DEHYDROGENATION
CATALYST
Herman S. Bloch, Skokie, Ill., assignor to Universal Oil
Products Company, Des Plaines. Ill.
No Drawing. Filed June 26, 1970, Ser. No. 50,333
Int. Cl. B01j 11/06, 11/08, 11/32
U.S. Cl. 252—464                             21 Claims

ABSTRACT OF THE DISCLOSURE

A catalytic composite, comprising a combination of catalytically effective amounts of a platinum group component, a Group IV–A metallic component, a Group V–A metallic component and an alkali or alkaline earth component with an alumina carrier material, is disclosed. A specific example of the disclosed composite is a combination of catalytically effective amounts of a platinum component, a germanium component, an arsenic component and an alkali or alkaline earth component with an alumina carrier material. Principal uses of this composite is in a method for the dehydrogenation of a dehydrogenatable hydrocarbon and particularly for the dehydrogenation of long chain normal paraffins to produce normal mono-olefins of the same carbon number.

---

The subject of the present invention is, broadly, an improved method for dehydrogenation of dehydrogenatable hydrocarbon to produce a hydrocarbon product containing the same number of carbon atoms but fewer hydrogen atoms. In one aspect, the present invention encompasses a method for dehydrogenating normal paraffin hydrocarbons containing 4 to 30 carbon atoms per molecule to form the corresponding normal mono-olefins with minimum production of by-products. In another aspect, the present invention involves a novel catalytic composite comprising a combination of a platinum group component, a Group IV–A metallic component, a Group V–A metallic component and an alkali or alkaline earth component with an alumina carrier material in amounts which are catalytically effective or active. This catalytic composite was highly preferred characteristics of activity, selectivity, and stability when it is employed in the dehydrogenation of dehydrogenatable hydrocarbons such as aliphatic hydrocarbons, naphthenes and alkylaromatic hydrocarbons.

The dehydrogenation of dehydrogenatable hydrocarbons is an important commercial process because of the great and expanding demand for dehydrogenated hydrocarbons for use in the manufacture of various chemical and petrochemical products such as detergents, plastics, synthetic rubbers, pharmaceutical products, high octane gasoline, perfumes, drying oils, ion-exchange resins, aromatic hydrocarbons and various other products well known to those skilled in the art. One example of this demand is in the manufacture of high octane gasoline by using $C_3$ and $C_4$ mono-olefins to alkylate isobutane. A second example is the greatly increased requirements of the petrochemical industry for the production of aromatic hydrocarbons from the naphthenes in petroleum. Another example of this demand is in the area of dehydrogenation of normal paraffin hydrocarbons to produce normal mono-olefins having 4 to 30 carbon atoms per molecule. These normal mono-olefins can, in turn, be utilized in the synthesis of vast numbers of other chemical products. For example, normal mono-olefins have become of substantial importance to the detergent industry where they are utilized to alkylate an alkylatable aromatic, such as benzene, with subsequent transformation of the product arylalkane into a wide variety of biodegradable detergents such as the alkylaryl sulfonate type of detergent which is most widely used today for household, industrial, and commercial purposes. Still another large class of detergents produced from these normal mono-olefins are the oxyalkylated phenol derivatives in which the alkyl phenol base is prepared by the alkylation of phenol with these normal mono-olefins. Still another type of detergent produced from these normal mono-olefins is a biodegradable alkylsulfate formed by the direct sulfation of the normal mono-olefin. Likewise, the olefin can be subjected to direct sulfonation to make biodegradable alkenylsulfonates. As a further example, these mono-olefins can be hydrated to produce alcohols which then, in turn, can be used to produce plasticizers and/or synthetic lube oils.

Regarding the use of products made by the dehydrogention of alkylaromatic hydrocarbons, these find wide application in industries including the petroleum, petrochemical, pharmaceutical, detergent, plastic industries, and the like. For example, ethylbenzene is dehydrogenated to produce styrene which is utilized in the manufacture of polystyrene plastics, styrene-butadiene rubber, and the like products. Isopropylbenzene is dehydrogenated to form alphamethyl styrene which, in turn, is extensively used in polymer formation and in the manufacture of drying oils, ion-exchange resins and the like materials.

Responsive to this demand for these dehydrogenation products, the art has developed a number of alternative methods to produce them in commercial quantities. One method that is widely utilized involves the selective dehydrogenation of dehydrogenatable hydrocarbons by contacting the hydrocarbons with a suitable catalyst at dehydrogenation conditions. As is the case with most catalytic procedures, the principal measure of effectiveness for this dehydrogenation method involves the ability to perform its intended function with minimum interference of side reactions for extended periods of time. The analytical terms used in the art to broadly measure how well a particular catalyst performs its intended functions in a particular hydrocarbon conversion reaction are activity, selectivity, and stability, and for purposes of discussion here these terms are generally defined for a given reactant as follows: (1) activity is a measure of the catalyst's ability to convert the hydrocarbon reactant into products at a specified severity level where severity level means the conditions used—that is, the temperature, pressure, contact time, and presence of diluents such as $H_2$; (2) selectivity usually refers to the amount of desired product or products obtained relative to the amount of the reactant converted; (3) stability refers to the rate of change with time of the activity and selectivity parameters—obviously the smaller rate implying the more stable catalyst. More specifically, in a dehydrogenation process, activity commony refers to the amount of conversion that takes place for a given dehydrogenatable hydrocarbon at a specified severity level and is typically measured on the basis of disappearance of the dehydrogenatable hydrocarbon; selectivity is typically measured by the amount, calculated on a mole percent of converted dehydrogenatable hydrocarbon basis, of the desired dehydrogenated hydrocarbon obtained at the particular severity level; and stability is typically equated to the rate of change with time of activity as measured by disappearance of the dehydrogenatable hydrocarbon and of selectivity as measured by the amount of desired hydrocarbon produced. Accordingly, the major problem facing workers in the hydrocarbon dehydrogenation art is the development of a more active and selective catalytic composite that has good stability characteristics.

I have now found a catalytic composite which possesses improved activity, selectivity and stability when it is employed in a process for the dehydrogenation of dehydrogenatable hydrocarbons. In particular, I have determined that a combination of catalytically effective amounts of a platinum group component, a Group IV-A metallic component, a group V-A metallic component and an alkali or alkaline earth component with an alumina carrier material can provide a superior dehydrogenation catalyst. This catalyst can, in turn, enable substantial improvements in a catalytic dehydrogenation process of the type that has traditionally used a platinum-containing catalyst. In addition, I have observed particularly good results in the dehydrogenation of long-chain normal paraffins with a catalyst comprising a combination of catalytically effective amounts of a platinum component, a germanium component, an arsenic component and an alkali or alkaline earth component with an alumina carrier material. This last composite is particularly useful in the dehydrogenation of $C_{10}$ to $C_{18}$ normal paraffin hydrocarbons to produce the corresponding normal mono-olefins with minimization of side reactions such as skeletal isomerization, aromatization and cracking. In sum, the present invention involves the significant finding that a combination of a Group IV-A metallic component and a group V-A metallic component can be utilized to beneficially modify and control the platinum group component of a dehydrogenation catalyst.

It is, accordingly, one object of the present invention to provide a novel method for the dehydrogenation of dehydrogenatable hydrocarbons utilizing a catalytic composite comprising a combination of catalytically active amounts of a platinum group component, a Group IV-A metallic component, a Group V-A metallic component and an alkali or alkaline earth component with an alumina carrier material. A second object is to provide a novel catalytic composite which has superior performance characteristics when utilized in a dehydrogenation process. Another object is to provide an improved method for the dehydrogenation of normal paraffin hydrocarbons to the corresponding normal mono-olefins with minimization of undesirable side products such as those formed from undesired cracking, isomerization and aromatization side reactions.

In brief summary, one embodiment of the present invention involves a novel catalytic composite comprising a combination of catalytically effective amounts of a platinum group component, a Group IV-A metallic component and a Group V-A metallic component and an alkali or alkaline earth component with an alumina carrier material.

A second, more specific embodiment relates to a catalytic composite comprising a combination of a catalytically effective amount of a platinum component, a germanium component, an arsenic component and an alkali or alkaline earth component with an alumina carrier material.

A third embodiment comprehends a method for dehydrogenating a dehydrogenatable hydrocarbon which comprises contacting the hydrocarbon with the catalytic composite described above in the first embodiment at dehydrogenation conditions.

Another embodiment involves a method for the dehydrogenation of normal paraffin hydrocarbons containing about 4 to about 30 carbon atoms per molecule to the corresponding normal mono-olefins, which method comprises contacting the normal paraffin hydrocarbon with the composite described in the first embodiment at dehydrogenation conditions.

Other objects and embodiments of the present invention relate to specific details regarding essential and preferred ingredients of the subject composite, preferred amounts of ingredients for this composite, suitable methods of preparing this composite, dehydrogenatable hydrocarbons that can be dehydrogenated with this composite, operating conditions for use with this composite in a dehydrogenation process and the like particulars. These objects and embodiments are hereinafter given in the following detailed discussion of the various facets of the present invention. It is to be noted that the terms "catalyst" and "catalytic composite" are used herein in an equivalent and interchangeable manner.

Regarding the dehydrogenatable hydrocarbon that is subjected to the instant method, it can, in general, be an organic compound having 2 to 30 carbon atoms per molecule and containing at least 1 pair of adjacent carbon atoms having hydrogen attached thereto. That is, it is intended to include within the scope of the present invention the dehydrogenation of any organic compound capable of being dehydrogenated to produce products containing the same number of carbon atoms but fewer hydrogen atoms, and capable of being vaporized at the dehydrogenation conditions used herein. More particularly, suitable dehydrogenatable hydrocarbons are: aliphatic compounds containing 2 to 30 carbon atoms per molecule, alkylaromatic hydrocarbons where the alkyl group contains 2 to 6 carbon atoms, and naphthenes or alkyl-substituted naphthenes. Specific examples of suitable dehydrogenatable hydrocarbons are: (1) alkanes such as ethane, propane, n-butane, isobutanes, n-pentane, isopentane, n-octane, n-hexane, 2-methylpentane, 2,2-dimethylbutane, n-heptane, 2-methylhexane, 2,2,3-trimethylbutane, and the like compounds; (2) naphthenes such as cyclopentane methylcyclopentane, ethylcyclopentane, n-propylcyclopentane, cyclohexane, isopropylcyclopentane, 1,3-dimethylcyclohexane, and the like compounds; and, (3) alkylaromatics such as ethylbenzene, n-propylbenzene, n-butylbenzene, 1,3,5-triethylbenzene, isopropylbenzene, isobutylbenzene, ethylnaphthalene, and the like compounds.

In a preferred embodiment, the dehydrogenatable hydrocarbon is a normal paraffin hydrocarbon having about 4 to about 30 carbon atoms per molecule. For example, normal paraffin hydrocarbons containing about 10 to 18 carbon atoms per molecule are dehydrogenated by the subject method to produce the corresponding normal mono-olefin which can, in turn, be used to alkylate benzene. The resulting alkylbenzene can then be sulfonated to make alkylbenzene sulfonate detergents having superior biodegradability. Likewise, n-alkanes having 10 to 18 carbon atoms per molecule can be dehydrogenated to the corresponding normal mono-olefin which, in turn, can be sulfated or sulfonated to make excellent detergents. Similarly, n-alkanes having 6 to 10 carbon atoms per molecule can be dehydrogenated to form the corresponding mono-olefins which can, in turn, be hydrated to produce valuable alcohols. Preferred feed streams for the manufacture of detergent intermediates contain a mixture of 4 or 5 adjacent normal paraffin homologues such as $C_{10}$ to $C_{13}$, $C_{11}$ to $C_{14}$, $C_{11}$ to $C_{15}$ and the like mixtures.

An essential feature of the present invention involves the use of a catalytic composite comprising a combination of catalytically effective amounts of a platinum group component, a group IV-A metallic component, a group V-A metallic component and an alkali or alkaline earth component with an alumina carrier material. Considering first the alumina carrier material, it is preferred that this material be a porous adsorptive, high surface area alumina having a relatively low apparent bulk density. Suitable alumina materials are the crystalline aluminas known as gamma, eta and theta-alumina, with gamma-alumina generally giving best results. As especially preferred carrier material has an apparent bulk density of about 0.3 to about 0.4 g./cc. and surface area characteristics such that the average pore diameter is about 20 to about 300 angstroms, the pore volume is about 0.1 to about 1 ml./g. and the surface area is about 100 to about 500 m.²/gm. Generally, best results are typically obtained with a gamma-alumina carrier material which is used in the form of spherical particles having a relatively small diameter, typically about 1/16", and apparent bulk density of about 0.33 g./cc., a pore volume of about 0.5 ml./g. and a surface area of about 175 m.²/g.

The alumina carrier material may be prepared in any suitable manner and may be synthetically prepared or naturally occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a solution of a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well known oil drop method which comprises forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to 20 hours. It is also a good practice to subject the calcined particles to a high temperature steam treatment in order to remove as much as possible of undesired acidic components. This manufacturing procedure effects conversion of the alumina hydrogel to the corresponding crystalline gamma-alumina. See the teachings of U.S. Pat. No. 2,620,314 for additional details.

As indicated above the preferred alumina carrier material has a relatively low apparent bulk density (ABD). Any suitable method disclosed in the art for preparing low ABD alumina particles can be utilized to prepare this preferred alumina carrier material. The preferred procedure is, however, disclosed in U.S. Pat. No. 2,774,743, and it essentially involves a method of preparation of gamma-alumina wherein the alumina particles while they are in the gelled state are aged first in oil at a temperature of at least 125° F. for at least 10 hours and thereafter in an aqueous ammonium hydroxide solution or the like solution at a temperature of at least 125° F. for an additional period of at least 10 hours. The oil used in this first aging step is preferably the same kind of oil which is used in the preferred dropping procedure given in U.S. Pat. No. 2,620,314. For example kerosene and Nujol give excellent results. The exact ABD of the spheres obtained from this procedure is a function of the concentration and temperature of the ammonium hydroxide solution utilized in this second aging step as is explained in U.S. Pat. No. 2,774,743. Typically, the temperature employed in this second aging step is about 125 to about 220° F., and the concentration of ammonia in the aging solution is selected from the range of about 4 to about 6 wt. percent.

One essential constituent of the instant catalytic composite is the Group IV-A metallic component. By the use of the generic term "Group IV-A metallic component" it is intended to cover the metals and compounds of the metals of Group IV-A of the Periodic Table. More specifically, it is intended to cover: germanium and the compounds of germanium; tin and the compounds of tin; lead and the compounds of lead; and mixtures of one or more of these metals and/or compounds of metals. This Group IV-A metallic component may be present in the catalytic composite as an elemental metal, or in chemical combination with one or more of the other ingredients of the composite, or as a compound of the Group IV-A metal such as the oxide, sulfide, halide, oxyhalide, oxychloride, aluminate and the like compounds; of these, the halide and oxyhalides are least preferred in the final catalyst, since they may contribute undesired acidity to the composite. Based on the evidence currently available, it is believed that best results are obtained when the Group IV-A metallic component exists in the final composite in an oxidation state above that of the elemental metal, and the subsequently described oxidation and reduction steps, that are preferably used in the preparation of the instant composite are believed to result in a catalytic composite which contains an oxide of the group IV-A metallic component such as germanium oxide, tin oxide and lead oxide. Regardless of the state in which this component exists in the composite, it can be utilized therein in any amount which is catalytically effective, with the preferred amount being selected as a function of the amount of the platinum group component contained in the composite. Generally, I have found excellent results when the amount of this Group IV-A metallic component is selected as a function of the amount of the platinum group component so that the atomic ratio of group IV-A metal to platinum group metal contained in the composite is within the range of about 0.1:1 to about 6:1, with best results obtained in the range of about 0.5:1 to about 4:1.

This Group IV-A component may be incorporated in the composite in any suitable manner known to the art such as by coprecipitation or cogellation with the alumina carrier material, or impregnation of the carrier material at any stage in its preparation. It is to be noted that it is intended to include within the scope of the present invention all conventional procedures for incorporating a metallic component in a catalytic composite, and the particular method of incorporation used is not deemed to be an essential feature of the present invention. However, best results are believed to be obtained when the Group IV-A component is uniformly distributed throughout the porous carrier material. One acceptable method of incorporating the Group IV-A component into the catalytic composite involves cogelling the Group IV-A component during the preparation of the alumina carrier material. This method typically involves the addition of a suitable soluble decomposable compound of the Group IV-A metal of interest to the alumina hydrosol. The resulting mixture is then commingled with a suitable gelling agent, such as a relatively weak alkaline reagent, and the resulting mixture is thereafter preferably gelled by dropping into a hot oil bath as explained hereinbefore. After aging, drying and calcining the resulting particles there is obtained an intimate combination of the oxide of the Group IV-A metal and alumina. One preferred method of incorporating this component into the composite involves utilization of a soluble, decomposable compound of the particular Group IV-A metal of interest to impregnate the porous carrier material either before, during or after the carrier material is calcined. In general, the solvent used during this impregnation step is selected on the basis of its capability to dissolve the desired Group IV-A compound without affecting the porous carrier material which is to be impregnated; ordinarily, good results are obtained when water or alcohol is the solvent; thus the preferred Group IV-A compounds for use in this impregnation step are typically water-soluble and decomposable. Examples of suitable Group IV-A compounds are: germanium difluoride, germanium tetrafluoride, germanium monosulfide, germanium dioxide, tin dibromide, tin dibromide di-iodide, tin dichloride di-iodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. In the case where the Group IV–A component is germanium, a preferred impregnation solution is germanium tetrachloride dissolved in anhydrous ethanol. In the case of tin, tin chloride dissolved in water is preferred. And in the case of lead, lead nitrate in water is preferred. Regardless of which impregnation solution is utilized, the Group IV–A component can be impregnated either prior to, simultaneously with, or after the other metallic components are added to the carrier material. Ordinarily, best results are obtained when this component is impregnated simultaneously with the platinum group components of the composite. Likewise, best results are ordinarily obtained when the Group IV–A component is germanium or a compound of germanium.

As indicated above, a second essential ingredient of the subject catalyst is the platinum group component. Although the process of the present invention is specifically directed to the use of a catalytic composite containing platinum, it is intended to include other platinum group metals such as palladium, rhodium, ruthenium, osmium, and iridium. The platinum group component such as platinum, may exist within the final catalytic composite as a compound such as an oxide, sulfide, halide, etc., or as an elemental metal, or in chemical combination with one or more of the other ingredients. As in the case of the Group IV–A element, the halide is least preferred in the final catalyst, and steps are incorporated in catalyst preparation to minimize the final halogen content. Generally, the amount of the platinum group component present in the final catalyst composite is small compared to the quantities of the other components combined therewith, although it can be used in any amount which is catalytically effective if desired. In fact, the platinum group component generally comprises about 0.01 to about 2 wt. percent of the final catalytic composite calculated on an elemental basis. Excellent results are obtained when the catalyst contains about 0.1 to about 0.8 wt. percent of the platinum group metal. The preferred platinum group component is platinum or a compound of platinum, although good results are obtained when it is palladium or a compound of palladium.

The platinum group component may be incorporated in the catalytic composite in any suitable manner such as coprecipitation or cogellation with the alumina carrier or impregnation of the alumina carrier at any stage in its preparation. The preferred method of preparing the catalyst involves the utilization of a soluble, decomposable compound of a platinum group metal to impregnate the alumina carrier material.. Thus, the platinum group component may be added by commingling the alumina carrier with an aqueous solution of chloroplatinic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, palladium chloride, chloropalladic acid, palladium nitrate, palladium sulfate, etc. The utilization of a platinum chloride compound, such as chloropalladic or chloroplatinic acid is ordinarily preferred. Hydrogen chloride, nitric acid, or the like acid is also generally added to the impregnation solution in order to further facilitate the distribution of the metallic component. In addition it is generally preferred to impregnate the alumina carrier material after it has been calcined in order to minimize the risk of washing away the valuable platinum metal compounds; however, in some cases it may be advantageous to impregnate the carrier material when it is in a gelled state.

Another essential feature of the catalyst of the present invention involves the presence therein of a Group V–A metallic component. The generic term "Group V–A metallic component" is used herein with the intent to cover the use of the following elements and compounds of arsenic, stant catalyst: arsenic and the compounds of arsenic, antimony and the compounds of antimony, bismuth and the compounds of bismuth and mixtures of one or more of these metals and/or one or more of these compounds. Although there is a disagreement on the question of whether or not elemental arsenic should be classified as a metal, it is to be noted that, for purposes of the present disclosure, arsenic is considered to be a metal or to have a metallic form; and it can, consequently, be referred to as a member of the class comprising the metals of Group V of the non-transition elements of the Periodic Table. This Group V–A metal component may be present in the catalytic composite as an elemental metal or in chemical combination with one or more ingredients of the composite or as a compound of the Group V–A metal such as a Group V–A metal oxide, sulfide, halide, oxyhalide, and the like compounds. Regardless of the state in which this component exists in the composite and although this component can be used in any amount which is catalytically effective, it is ordinarily preferred that the amount thereof is determined as a function of the amount of the platinum group component contained in the catalyst. More specifically, the preferred practice is to select the amount of this component as a function of the amount of the platinum group component contained in the composite in order to result in a composite having an atomic ratio of Group V–A metal to platinum group metal selected from the range of about 0.1:1 to about 0.8:1, with best results obtained at an atomic ratio of about 0.1:1 to about 0.5:1.

This Group V–A component can be incorporated in the composite in any suitable manner known to the art such as by physical admixture, by coprecipitation or cogellation with the alumina carrier material or by impregnation of the alumina carrier material at any stage in its preparation. It is to be noted that it is intended to include within the scope of the present invention all conventional methods known to the catalyst formulation art for incorporating a Group V–A metallic component in a composite, and the particular method of incorporation used is not deemed to be an essential feature of the present invention. Best results are believed to be obtained when the Group V–A metallic component is relatively uniformly distributed throughout the carrier material. One acceptable method of incorporating this component involves coprecipitation or cogelling a Group V–A metal during the preparation of the alumina carrier material. Another method of incorporating this component involves utilization of a soluble, decomposable compound of the particular Group V–A metal of interest to impregnate the alumina carrier material either before, during or after the alumina carrier material is calcined. In general, the solvent used during this impregnation step is selected on the basis of its capability to dissolve the desired Group V–A compound without affecting the alumina carrier material which is to be impregnated. Ordinarily, good results are obtained when water is the solvent, either alone or with one or more solubility-increasing agents such as mild acids, or mild bases. Examples of Group V–A compounds which are suitable for use in this impregnation step are: orthoarsenic acid, arsenic pentafluoride, arsenic tri-iodide, arsenic pentoxide, arsenic trioxide, bismuth citrate, bismuth di-iodide, bismuth oxycarbonate, bismuth trichloride, bismuth trifluoride, bismuth nitrate, bismuth oxalate, bismuth trioxide, bismuth ammonium citrate, antimony trichloride, antimony pentafluoride, antimony trifluoride, antimony oxyhydrate, antimony tartrate and the like compounds. In the case where the Group V–A component is arsenic, a preferred impregnation solution is either an ammoniacal solution of arsenic pentoxide, or an aqueous solution of orthoarsenic acid. In the case where the Group V–A component is bismuth, a preferred impregnation solution is an aqueous solution of bismuth ammonium citrate. As in the case where the Group V–A component is antimony, a preferred impregnation solution is antimony trichloride in water. Regardless of which impregnation solution is utilized, the Group V–A component can be impregnated either prior to, simultaneously with, or after the other components are added to the carrier material. Ordinarily, best results are obtained when this component is incorporated either simultaneously with or after the other metallic components are added to the carrier material. In general, best results are obtained when the Group V-A metallic component is arsenic or a compound of arsenic.

Yet another essential ingredient of the instant catalyst is the alkali or alkaline earth component. More specifically, this component is selected from the group consisting of the compounds of the alkali metals—cesium, rubidium, potassium, sodium, and lithium—and of the alkaline earth metals—calcium, strontium, barium, and magnesium. This component may exist within the catalytic composite as a relatively stable compound such as the oxide or sulfide, or in combination with one or more of the other components of the composite, or in combination with the carrier material such as, for example, in the form of a metal aluminate. Since, as is explained hereinafter, the composite containing the alkali or alkaline earth is always calcined or oxidized in an air atmosphere before use in the conversion of hydrocarbons, the most likely state this component exists in during use in dehydrogenation is the metallic oxide. Regardless of what precise form in which it exists in the composite, the amount of this component utilized is preferably selected to provide a composite containing about 0.25 to about 2.5 wt. percent of the alkali or alkaline earth metal, and, more preferably, about 0.5 to about 1.5 wt. percent. Best results are obtained when this component is a compound of lithium, sodium or potassium.

This alkali or alkaline earth component may be combined with the alumina carrier material in any manner known to those skilled in the art such as by impregnation, coprecipitation, physical admixture, and the like procedures. However, the preferred procedure involves impregnation of the carrier material either before, during or after it is calcined, or before, during or after the other ingredients are added to the carrier material. Best results are ordinarily obtained when this component is added to the carrier material simultaneously with or after the other metallic components because of the alkali metal or alkaline earth metal acts to neutralize some of the acid used in the preferred impregnation procedure for these metallic components. Typically, the impregnation of the carirer material with this component is performed by contacting the carrier material with a solution of a suitable decomposable compound or salt of the desired alkali or alkaline earth metal. Hence, suitable compounds include the alkali metal or alkaline earth metal halides, sulfates, nitrates, acetates, carbonates, phosphates and the like compounds. For example, excellent results are obtained by impregnating the carrier material with an aqueous solution of lithium nitrate, sodium nitrate or potassium nitrate.

Regardless of the details of how the components of the catalyst are combined with the alumina carrier material, the resulting composite generally will be dried at a temperature of about 200° F. to about 600° F. for a period of from about 2 to 24 hours or more, and finally oxidized at a temperature of about 600° F. to about 1100° F. in an air atmosphere for a period of about 0.5 to 10 hours, preferably about 1 to about 5 hours, in order to substantially convert the metallic components to the oxide form. When acidic components are present in any of the reagents used to effect incorporation of any one of the components of the subject composite, it is a good practice to subject the resulting composite to a high temperature treatment with steam or with a mixture of steam and air, either after or before this oxidation step in order to remove as much as possible of the undesired acidic component. For example, when the platinum group component is incorporated by impregnating the carrier material with chloroplatinic acid, it is preferred to subject the resulting composite to a high temperature treatment with stream in order to remove as much as possible of the undesired chloride.

It is preferred that the resultant oxidized catalytic composite be subjected to a substantially water-free reduction prior to its use in the conversion of hydrocarbons. This step is designed to insure a uniform and finely divided dispersion of the metallic components throughout the carrier material. Preferably, substantially pure and dry hydrogen (i.e. less than 20 vol. p.p.m. $H_2O$) is used as the reducing agent in this step. The reducing agent is contacted with the calcined composite at a temperature of about 800° F. to 1200° F. a gas hourly space velocity of about 100 to about 5,000 hr.$^{-1}$, and for a period of time of about 0.5 to 10 hours or more, effective to substantially reduce at least the platinum group component. This reduction treatment may be performed in situ as part of a start-up sequence if precautions are taken to predry the plant to a substantially water-free state and if substantially water-free hydrogen is used.

Although it is not essential, the resulting reduced catalytic composite may, in some cases, be beneficially subjected to a presulfiding operation designed to incorporate in the catalytic composite from about 0.05 to about 0.5 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture containing a mole ratio of $H_2$ to $H_2S$ of about 10:1 at conditions sufficient to effect the desired incorporation of sulfur, generally including a temperature ranging from about 50° F. up to about 1100° F. or more. This presulfiding step can be performed in situ or ex situ. Ordinarily, in situ sulfiding is preferred.

According to the method of the present invention, the dehydrogenatable hydrocarbon is contacted with a catalytic composite of the type described above in a dehydrogenation zone maintained at dehydrogenation conditions. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, the hydrocarbon feed stream is preheated by any suitable heating means to the desired reaction temperature and then passed into a dehydrogenation zone containing a fixed bed of the catalyst type previously characterized. It is, of course, understood that the dehydrogenation zone may be one or more separate reactors with suitable heating means therebetween to insure that the desired conversion temperature is maintained at the entrance to each reactor. It is also to be noted that the reactants may be contacted with the catalyst bed in either upward, downward, or radial flow fashion, with the latter being preferred. In addition, it is to be noted that the reactants may be in the liquid phase, a mixed liquid-vapor phase, or a vapor phase when they contact the catalyst, with best results obtained in the vapor phase.

Although hydrogen is the preferred diluent for use in the subject dehydrogenation method, in some cases other art-recognized diluents may be advantageously utilized such as steam, methane, carbon dioxide, and the like diluents. Hydrogen is preferred because it serves the dual-function of not only lowering the partial pressure of the dehydrogenatable hydrocarbon, but also of suppressing the formation of hydrogen-deficient, carbonaceous deposits on the catalytic composite. Ordinarily, hydrogen is utilized in amounts sufficient to insure a hydrogen to hydrocarbon mole ratio of about 1:1 to about 20:1, with best results obtained in the range of about 1.5:1 to about 10:1. The hydrogen stream charged to the dehydrogenation zone will typically be recycle hydrogen obtained from the effluent stream from this zone after a suitable separation step.

When hydrogen is used as the diluent, a preferred practice is to add water or a water-producing compound to the dehydrogenation zone. This water additive may be included in the charge stock, or in the hydrogen stream, or in both of these, or added independently of these. Ordinarily, it is preferred to inject the necessary water by saturating at least a portion of the input hydrogen stream with water. Good results are also obtained when a water-producing compound such as a $C_2$ to $C_8$ alcohol is added to the charge stock. Regardless of the source of the water, the amount of equivalent water added should be sufficient to maintain the total amount of water continuously entering the dehydrogenation zone in the range of about 50 to about 10,000 wt. p.p.m. of the charge stock, with best results obtained at a level corresponding to about 1500 to 5000 wt. p.p.m. of the charge stock.

Concerning the conditions utilized in the process of the present invention, these are generally selected from the conditions well known to those skilled in the art for the particular dehydrogenatable hydrocarbon which is charged to the process. More specifically, suitable conversion temperatures are selected from the range of about 700 to about 1200° F., with a value being selected from the lower portion of this range for the more easily dehydrogenated hydrocarbons such as the long chain normal paraffins and from the higher portion of this range for the more difficultly dehydrogenated hydrocarbons such as propane, butane, and the like hydrocarbons. For example, for the dehydrogenation of $C_6$ to $C_{30}$ normal paraffins, best results are ordinarily obtained at a temperature of about 800 to about 950° F. The pressure utilized is ordinarily selected at a value which is as low as possible consistent with the maintenance of catalyst stability, and is usually about 0.1 to about 10 atmospheres, with best results ordinarily obtained in the range of about .5 to about 3 atmospheres. In addition, a liquid hourly space velocity (calcuated on the basis of the volume amount, as a liquid, of hydrocarbon charged to the dehydrogenation zone per hour divided by the volume of the catalyst bed utilized) is selected from the range of about 1 to about 40 hr.$^{-1}$, with best results for the dehydrogenation of long chain normal paraffins typically obtained at a relatively high space velocity of about 25 to 35 hr.$^{-1}$.

Regardless of the details concerning the operation of the dehydrogenation step, an effluent stream will be withdrawn therefrom. This effluent will contain unconverted dehydrogenatable hydrocarbons, hydrogen, and products of the dehydrogenation reaction. This stream is typically cooled and passed to a separating zone wherein a hydrogen-rich vapor phase is allowed to separate from a hydrocarbon-rich liquid phase. In general, it is usually desired to recover the unreacted dehydrogenatable hydrocarbon from this hydrocarbon-rich liquid phase in order to make the dehydrogenation process economically attractive. This recovery step can be accomplished in any suitable manner known to the art such as by passing the hydrocarbon-rich liquid phase through a bed of suitable adsorbent material which has the capability to selectively retain the dehydrogenated hydrocarbons contained therein or by contacting same with a solvent having a high selectivity for the dehydrogenated hydrocarbon or by a suitable fractionation scheme where feasible. In the case where the dehydrogenated hydrocarbon is a mono-olefin, suitable adsorbents having this capability are activated silica gel, activated carbon, activated alumina, various types of specially prepared molecular sieves, and the like adsorbents. In another typical case, the dehydrogenated hydrocarbons can be separated from the unconverted dehydrogenatable hydrocarbons by utilizing the inherent capability of the dehydrogenated hydrocarbons to enter into several well known chemical reactions such as alkylation, oligomerization, halogenation, sulfonation, hydration, oxidation and the like reactions. Irrespective of how the dehydrogenated hydrocarbons are separated from the unreacted hydrocarbons, a stream containing the unreacted dehydrogenatable hydrocarbons will typically be recovered from this hydrocarbon separation step and recycled to the dehydrogenation step. Likewise, the hydrogen phase present in the hydrogen separating zone will be withdrawn therefrom, a portion of it vented from the system in order to remove the net hydrogen make, and the remaining portion is typically recycled, through suitable compressing means, to the dehydrogenation step in order to provide diluent hydrogen therefor.

In a preferred embodiment of the present invention wherein long chain normal paraffin hydrocarbons are dehydrogenated to the corresponding normal mono-olefins, a preferred mode of operation of this hydrocarbon recovery step involves an alkylation reaction. In this mode, the hydrocarbon rich liquid phase withdrawn from the separating zone is combined with a stream containing an alkylatable aromatic and the resulting mixture passed to an alkylation zone containing a suitable highly acidic catalyst such as an anhydrous solution of hydrogen fluoride. In the alkylation zone the mono-olefins react with the alkylatable aromatic while the unconverted normal paraffins remain substantially unchanged. The effluent stream from the alkylation zone can then be easily separated, typically by means of a suitable fractionation system, to allow recovery of the unreacted normal paraffins. The resulting stream of unconverted normal paraffins is then usually recycled to the dehydrogenation step of the present invention.

The following working examples are introduced to illustrate further the novelty, mode of operation, utility and benefits associated with the dehydrogenation method and catalytic composite of the present invention. These examples are intended to be illustrative rather than restrictive.

These examples are all performed in a laboratory scale dehydrogenation plant comprising a reactor, a hydrogen separating zone, a heating means, cooling means, pumping means, compressing means, and the like equipment. In this plant, the feedstream containing the dehydrogenatable hydrocarbon is combined with a hydrogen stream and the resultant mixture heated to the desired conversion temperature, which refers herein to the temperature maintained at the inlet to the reactor. The heated mixture is then passed into contact with the catalyst which is maintained as a fixed bed of catalyst particles in the reactor. The pressures reported herein are recorded at the outlet from the reactor. An effluent stream is withdrawn from the reactor, cooled, and passed into the separating zone wherein a hydrogen gas phase separates from a hydrocarbon-rich liquid phase containing dehydrogenated hydrocarbons, unconverted dehydrogenatable hydrocarbons and a minor amount of side products of the dehydrogenation reaction. In Example I through V, a portion of the hydrogen-rich gas phase is recovered as excess recycle gas with the remaining portion being continuously recycled through suitable compressive means to the heating zone as described above. In Example VI the hydrogen stream is used on an once-through basis. The hydrocarbon-rich liquid phase from the separating zone is withdrawn therefrom and subjected to analysis to determine conversion and selectivity for the desired dehydrogenated hydrocarbon as will be indicated in the examples. Conversion numbers of the dehydrogenatable hydrocarbon reported herein are all calculated on the basis of disappearance of the dehydrogenatable hydrocarbon and are expressed in mole percent. Similarly, selectivity numbers are reported on the basis of moles of desired hydrocarbon produced per 100 moles of dehydrogenatable hydrocarbon converted.

All of the catalysts utilized in these examples are prepared according to the following general method with suitable modification in stoichiometry to achieve the composition reported in each example. First, an alumina carrier material having a relatively low apparent bulk density and comprising $\frac{1}{16}''$ spherical particles is prepared by the following procedure: an aluminum hydroxyl chloride sol is formed by dissolving substantially pure aluminum pellets in a hydrochloric acid solution; hexamethylenetetramine is then added to the sol to form a mixture thereof; the resulting mixture of base and sol is then passed into a dropping means wherein it is formed into discrete droplets; the droplets are then passed into a forming chamber containing a substantial quantity of Nujol in a manner so that they assume a substantially spherical shape during passage through the Nujol; the resulting spherical particles are then aged in the Nujol at a temperature of about 195° F. for about 16 hours; thereafter, the resulting aged particles are further aged in an aqueous solution of ammonium hydroxide at a temperature of about 200° F. for about 16 hours; the concentration of ammonia in this last solution is adjusted according to the procedure set forth in U.S. Pat. No. 2,774,743 in order to achieve the spherical particles having an apparent bulk density of about 0.33 g./cc.; the aged particles are then dried, washed with an ammoniacal solution, dried at a relatively low temperature, calcined at a relatively high temperature and steamed to form spherical particles of gamma-alumina containing substantially less than 0.1 wt. percent combined chloride. Additional details as to this method of preparing this low ABD alumina carrier material are given in U.S. Pats. Nos. 2,620,314 and 2,774,743.

Second, a measured amount of germanium tetrachloride is dissolved in anhydrous ethanol. The resulting solution is then aged at room temperature until an equilibrium condition is established therein. An aqueous solution containing chloroplatinic acid and a hydrogen chloride is then prepared. The two solutions are then intimately admixed and used to impregnate the gamma-alumina particles. The amounts of the various reagents utilized at this impregnation step are carefully selected to yield final composites containing the amount of platinum and germanium specified in each of the following examples. The mixture of the two solutions is maintained in contact with the alumina particles for a period of about ½ hour at a temperature of 70° F. Thereafter, the temperature of the resulting mixture is raised to about 225° F., and the excess solution is evaporated in a period of about 1 hour. The resulting dried and impregnated particles are then subjected to an oxidation treatment and an air stream at a temperature of about 500 to about 1100° F., for a period of about 1 to about 10 hours. Thereafter, the resulting oxidized particles are treated with an air stream containing from about 10 to about 30 vol. percent steam at a temperature of 800 to about 1,100° F., for an additional period of about 1 to about 10 hours in order to reduce the residual combined chloride in the composite.

Third, the resulting impregnated particles are then contacted, in a second impregnation step with an aqueous ammoniacal arsenic pentoxide solution in an amount carefully selected to result in a final composite containing the amount of arsenic specified in the following examples. The resulting arsenic impregnated particles are then dried, oxidized and steamed according to the procedure used following the first impregnation step.

Fourth, the alkali or alkaline earth metal component is added to the resulting oxidized particles of the catalyst in a third impregnation step. This third impregnation step involves contacting the oxidized sol with an aqueous solution of a suitable decomposable salt of the desired alkali or alkaline earth component. For the composite utilized in the present examples the salt is either lithium nitrate or potassium nitrate. The amount of alkali or alkaline earth reagents utilized in this step is carefully chosen to result in the final composite containing the amount of this component specified in the following examples. The resulting impregnated particles are then oxidized and steamed in exactly the same manner as after the first impregnation step.

Finally, in all of these examples, the resulting thrice impregnated particles are reduced during start-up by contacting the hydrogen stream at conditions selected to substantially reduce the platinum component thereof to the elemental state. Thereafter, the resulting reduced catalyst was sulfided in situ with a stream of hydrogen containing 1 mole percent $H_2S$ at a temperature of about 860° F., for about 5 hours.

In all of the following examples where it is indicated that water is charged to the reactor during the course of the run, the amount of water specified is the total amount of water and water-producing substances, calculated on an equivalent water basis, entering the reactor from any source. This amount of water is expressed as the equivalent wt. p.p.m. in the charge stock despite the fact that all of the water does not necessarily enter the reactor in admixture with the charge stock. The water is added to the reactor either by saturating at least a portion of the input hydrogen stream with water or by adding a suitable water-producing compound to the charge stock.

EXAMPLE I

The reactor is loaded with a sample of a catalyst, containing, on an elemental basis, 0.375 wt. percent platinum, 0.6 wt. percent lithium and sufficient germanium and arsenic to result in the catalyst having an atomic ratio of germanium to platinum of about 1:1 and of arsenic to platinum of about 0.3:1. In addition, the catalyst initially contains about 0.1 wt. percent sulfur and less than 0.1 wt. percent chloride. The charge stock is commercial grade normal hexane. This charge stock is contacted with the catalyst at a temperature of about 1050° F., a pressure of about 10 p.s.i.g., and a liquid hourly space velocity (LHSV) of 17 hrs.$^{-1}$, a hydrogen to hydrocarbon mole ratio of 8:1 and an amount of water corresponding to about 2,000 wt. p.p.m. The hydrocarbon product stream from the unit is recovered during a ten hour test period, and an analysis of it indicates a conversion of about 11% with a selectivity for m-hexenes of about 90%.

EXAMPLE II

The catalyst contains, on an elemental basis, 0.375 wt. percent platinum, 1.5 wt. percent potassium and sufficient germanium and arsenic to result in atomic ratios of germanium to platinum of 3.6:1 and of arsenic to platinum of 0.4:1. The charge stock is commercial grade isobutane containing 99.7 wt. percent isobutane and about 0.3 wt. percent normal butane. The conditions utilized are a temperature of about 1100° F., a hydrogen to hydrocarbon mole ratio of about 2:1, and LHSV of about 4 hours$^{-1}$, a pressure of 10 p.s.i.g. and water in an amount of about 1,000 wt. p.p.m. The result from a 20 hour test period indicated an average conversion of about 30% with a selectivity for isobutylene of about 98%.

EXAMPLE III

The catalyst contains, on an elemental basis 0.375 wt. percent platinum, 0.8 wt. percent lithium, 0.7 wt. percent sulfur, less than 0.1 wt. percent chloride and amounts of germanium and arsenic selected to result in atomic ratios of germanium to platinum of 3.6:1 and of arsenic to platinum of 0.1:1. The charge stock is substantially pure normal tetradecane. The conditions utilized are a temperature of 830° F., a pressure of 20 p.s.i.g., a LHSV of 32 hrs.$^{-1}$, hydrogen to hydrocarbon mole ratio of 8:1 and a $H_2O$ addition rate corresponding to about 2,500 wt. p.p.m. The results of a 20 hour test period show an average conversion of approximately 13% and a selectivity for tetradecene of about 90%.

EXAMPLE IV

The catalyst is the same as specified in Example III. The charge stock is commercial grade cyclohexane. The conditions utilized are a temperature of 825° F., a pressure of 100 p.s.i.g., an LHSV of 10 hr.$^{-1}$ and hydrogen to hydrocarbon mole ratio of 8:1 and a water addition rate of about 2,000 p.p.m. The results of a 100 hour test period indicates a conversion of about 98% with a selectivity for benzene of about 95%.

EXAMPLE V

The catalyst contains, on an elemental basis, 0.75 wt. percent platinum, 2 wt. percent potassium, less than 0.1 wt. percent combined chloride, about 0.1 wt. percent sulfur and sufficient amounts of germanium and arsenic to result in atomic ratios of germanium to platinum of about 1:1 and of arsenic to platinum of about 0.3:1. The charge stock is commercial grade ethylbenzene. The conditions utilized include a temperature of about 950° F., a pressure of about 15 p.s.i.g., a LHSV of about 32 hrs.$^{-1}$, a hydrogen to hydrocarbon mole ratio of about 8:1 and a $H_2O$ addition rate corresponding to about 2,000 wt. p.p.m. The results indicate that during a 20 hour test period about 80% of equilibrium conversion is achieved at a selectivity for styrene of about 98%.

EXAMPLE VI

In order to demonstrate the beneficial effect of the arsenic component on the germanium and platinum-containing catalyst, a comparison test was made between a catalyst of the present invention and a control catalyst which was free of arsenic but contained germanium, platinum and lithium. The catalyst of the present invention contained, on an elemental basis, 0.375 wt. percent platinum, 0.6 wt. percent lithium, less than 0.07 wt. percent chloride, about 0.1 wt. percent sulfur and amounts of arsenic and germanium selected to result in atomic ratios of germanium to platinum of about 0.7:1 and of arsenic to platinum of about 0.1:1. The control catalyst, on the other hand, contained on an elemental basis, 0.375 wt. percent platinum, 0.6 wt. percent lithium, less than 0.1 wt. percent chloride, about 0.1 wt. percent sulfur, and an amount of germanium sufficient to result in an atomic ratio of germanium to platinum of about 1:1. The control catalyst was prepared in the manner hereinbefore specified except that the second impregnation step was omitted. The charge stock was a $C_{11}$-$C_{14}$ fraction containing 98.8 wt. percent normal paraffins and 1.1 wt. percent non-normal paraffins. More specifically, it contained approximately 0.1 wt. percent n-$C_{10}$, 17.0 wt. percent n-$C_{11}$, 31.2 wt. percent n-$C_{12}$, 35.6 n-$C_{13}$, 14.8 n-$C_{14}$ and 0.1 n-$C_{15}$. The conditions utilized were a pressure of about 30 p.s.i.g., a LHSV of about 32 hrs.$^{-1}$, a hydrogen to hydrocarbon mole ratio of about 8:1 and a water addition rate corresponding to about 2,000 wt. p.p.m. of the charge. The runs were both conducted at an inlet temperature to the reactor which ranged between 460 and 475° C. The results of the comparison tests between the two catalysts are given in the following Table I in terms of the conversion and selectivity for the corresponding normal mono-olefins that were observed at each of the four different temperature conditions.

TABLE I.—RESULTS OF COMPARISON TEST

| Temp, ° C. | Control catalyst | | Catalyst of the present invention | |
|---|---|---|---|---|
| | Conversion, percent | Selectivity percent | Conversion percent | Selectivity percent |
| 460 | 10.8 | 99 | 9.4 | 97 |
| 465 | 11 | 98 | 10.9 | 95.5 |
| 470 | 11 | 98 | 11.6 | 97 |
| 475 | 10.8 | 97 | 12.5 | 97 |

With reference now to Table I, it can be seen that the effect of the arsenic component on the control catalyst was an improvement in activity and stability of the catalyst as the run progressed coupled with the ability to achieve approximately the same high selectivity as the control catalyst for the desired normal mono-olefins.

It is intended to cover by the following claims all changes and modifications of the above disclosure of the present invention that would be self-evident to a man of ordinary skill in the catalytic formulation art or in the hydrocarbon dehydrogenation art.

I claim as my invention:

1. A catalytic composite comprising a combination of catalytically effective amounts of a platinum group metal or a platinum group metal compound, a Group IV-A metal or Group IV-A metal compound, a Group V-A metal or Group V-A metal compound and an alkali or alkaline earth metal or an alkali or alkaline earth metal compound with an alumina carrier material.

2. A catalytic composite as defined in claim 1 wherein platinum group metal component is platinum or a compound of platinum.

3. A catalytic composite as defined in claim 1 wherein platinum group metal component is palladium or a compound of palladium.

4. A catalytic composite as defined in claim 1 wherein Group IV-A metal component is germanium or a compound of germanium.

5. A catalytic composite as defined in claim 1 wherein Group IV-A metal component is tin or a compound of tin.

6. A catalytic composite as defined in claim 1 wherein Group IV-A metal component is lead or a compound of lead.

7. A catalytic composite as defined in claim 1 wherein Group V-A metal component is arsenic or a compound of arsenic.

8. A catalytic composite as defined in claim 1 wherein Group V-A metal component is antimony or a compound of antimony.

9. A catalytic composite as defined in claim 1 wherein Group V-A metal component is bismuth or a compound of bismuth.

10. A catalytic composite as defined in claim 1 wherein alkali or alkaline earth metal component is a compound of lithium.

11. A catalytic composite as defined in claim 1 wherein alkali or alkaline earth metal component is a compound of potassium.

12. A catalytic composite as defined in claim 1 wherein alkali or alkaline earth metal component is a compound of sodium.

13. A catalytic composite as defined in claim 1 wherein said alumina carrier material has an apparent bulk density selected from the range of about 0.3 to about 0.4 g./cc.

14. A catalytic composite as defined in claim 1 wherein said alumina carrier material is gamma-alumina.

15. A catalytic composite as defined in claim 1 wherein said composite contains, on an elemental basis, about 0.01 to about 2 wt. percent of the platinum group metal, about 0.25 to about 2.5 of the alkali metal or alkaline earth metal, and sufficient amounts of the Group IV-A metal and of the Group V-A metal to result in an atomic ratio of Group IV-A metal to platinum group metal of about 0.1:1 to about 6:1 and in an atomic ratio of the Group V-A metal to the platinum group metal of about 0.1 to about 0.8:1.

16. A catalytic composite comprising a combination of catalytically effective amounts of platinum or a compound of platinum, germanium or a compound of germanium, arsenic or a compound of arsenic and an alkali or alkaline earth metal or a compound of an alkali or alkaline earth metal with an alumina carrier material.

17. A catalytic composite as defined in claim 16 wherein said composite contains on an elemental basis, about 0.01 to about 2 wt. percent platinum about 0.25 to about 2.5 wt. percent alkali or alkaline earth metal and sufficient amounts of arsenic and germanium to result in an atomic ratio of arsenic to platinum of about 0.1:1 to about 0.8:1 and in an atomic ratio of germanium to platinum of about 0.1:1 to about 6:1.

18. A catalytic composite as defined in claim 16 wherein said composite contains on an elemental basis about 0.1 to about 0.8 wt. percent platinum about 0.5 to about 1.5 wt. percent alkali or alkaline earth metal and sufficient amounts of germanium and arsenic to result in an atomic ratio of germanium to platinum of about 0.5:1 to about 4:1 and in an atomic ratio of arsenic to platinum of about 0.1:1 to about 0.5:1.

19. A catalytic composite as defined in claim 16 wherein said alumina carrier material has an apparent bulk density selected from the range of about 0.3 to about 0.4 g./cc.

20. A catalytic composite as defined in claim 16 wherein alkali or alkaline earth metal component is a compound of lithium.

21. A catalytic composite as defined in claim 16 wherein alkali or alkaline earth metal component is a compound of potassium.

References Cited

UNITED STATES PATENTS

| | | | |
|---|---|---|---|
| 3,291,755 | 12/1966 | Haensel et al. | 252—464 |
| 3,531,543 | 9/1970 | Clippinger et al. | 252—466 PT |
| 3,576,766 | 4/1971 | Rausch | 252—466 PT |

DANIEL E. WYMAN, Primary Examiner

W. J. SHINE, Assistant Examiner

U.S. Cl. X.R.

252—461, 466 PT, 473, 474; 260—683.3